United States Patent
Doerry et al.

(10) Patent No.: US 9,784,818 B1
(45) Date of Patent: Oct. 10, 2017

(54) TIME-DEPENDENT PHASE ERROR CORRECTION USING DIGITAL WAVEFORM SYNTHESIS

(71) Applicants: National Technology & Engineering Solutions of Sandia, LLC, Albuquerque, NM (US); General Atomics Aeronautical Systems, Inc., San Diego, CA (US)

(72) Inventors: Armin W. Doerry, Albuquerque, NM (US); Stephen Buskirk, Encinitas, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 321 days.

(21) Appl. No.: 14/045,993

(22) Filed: Oct. 4, 2013

(51) Int. Cl.
*G01S 7/282* (2006.01)
(52) U.S. Cl.
CPC .................. *G01S 7/282* (2013.01)
(58) Field of Classification Search
CPC ......................................... G01S 7/28
USPC ......................................... 342/195
See application file for complete search history.

(56) References Cited

U.S. PATENT DOCUMENTS

| | | | | |
|---|---|---|---|---|
| 4,933,890 A * | 6/1990 | Nuytkens | ............... | G06F 1/025 708/101 |
| 6,016,080 A * | 1/2000 | Zuta | ............... | H03L 7/085 324/76.82 |
| 6,614,813 B1 * | 9/2003 | Dudley | ............... | G06F 1/0335 370/532 |
| 6,825,800 B1 * | 11/2004 | Dudley | ............... | G01S 7/282 342/194 |
| 6,828,933 B1 * | 12/2004 | Doerry | ............... | G01S 7/282 342/194 |
| 6,836,240 B1 * | 12/2004 | Dubbert | ............... | G01S 7/282 342/194 |
| 7,212,154 B2 * | 5/2007 | Pennington | ............... | G01S 7/282 342/202 |

(Continued)

OTHER PUBLICATIONS

Sloan, et al., "Affordable, miniaturized SAR for tactical UAV applications", Proceedings of SPIE Conference vol. 5409, Airborne Intelligence, Surveillance, Reconnaissance (ISR) Systems and Applications, 2004, pp. 1-10.

(Continued)

*Primary Examiner* — Tashiana Adams
*Assistant Examiner* — Helena Seraydaryan
(74) *Attorney, Agent, or Firm* — Medley, Behrens & Lewis, LLC

(57) ABSTRACT

The various technologies presented herein relate to correcting a time-dependent phase error generated as part of the formation of a radar waveform. A waveform can be predistorted to facilitate correction of an error induced into the waveform by a downstream operation/component in a radar system. For example, amplifier power droop effect can engender a time-dependent phase error in a waveform as part of a radar signal generating operation. The error can be quantified and an according complimentary distortion can be applied to the waveform to facilitate negation of the error during the subsequent processing of the waveform. A time domain correction can be applied by a phase error correction look up table incorporated into a waveform phase generator.

13 Claims, 4 Drawing Sheets

(56) References Cited

U.S. PATENT DOCUMENTS

| | | | | |
|---|---|---|---|---|
| 7,907,019 B1* | 3/2011 | Brown | ............... | G02B 26/085 |
| | | | | 331/1 A |
| 8,154,782 B1* | 4/2012 | Brown | ............... | G02B 26/0833 |
| | | | | 331/1 R |
| 2009/0235127 A1* | 9/2009 | Ohishi | ............... | G01S 7/487 |
| | | | | 714/700 |
| 2010/0321750 A1* | 12/2010 | Burinskiy | ............... | G09G 3/02 |
| | | | | 359/198.1 |
| 2012/0002752 A1* | 1/2012 | Coan | ............... | H03F 1/3247 |
| | | | | 375/297 |

OTHER PUBLICATIONS

Wells, et al., "Synthetic aperture radar: not just a sensor of last resort", SPIE Airborne Reconnaissance XXVII, 2003, Proceedings of the SPIE, vol. 5109, pp. 98-109.

Doerry, et al., "Digital Signal Processing Applications in High-Performance Synthetic Aperture Radar Processing", Signals, Systems and Computers 2004. Record of the 37th Asilomar Conference, Nov. 9-12, 2003, vol. 1, pp. 1-3.

Wells, et al., "Developments in SAR and IFSAR Systems and Technologies at Sandia National Laboratories", Aerospace Conference Proceedings, 2003 IEEE, vol. 2, pp. 1085-1095.

Walker, et al., "A High-Resolution, Four-Band SAR Testbed with Real-Time Image Formation", Geoscience and Remote Sensing Symposium, 1996, IGARSS—Remote Sensing for a Sustainable Future, vol. 3, pp. 1881-1885.

* cited by examiner

TIME-DEPENDENT PHASE ERROR CORRECTION USING DIGITAL WAVEFORM SYNTHESIS

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Radar systems and similar technologies require high-fidelity waveforms to be transmitted and received for processing, for example, synthetic aperture radar (SAR) requires fine range resolution. An approach for achieving fine range resolution can comprise transmitting a very narrow pulse and sampling the returned echo. This approach, while simple in theory, has some practical limitations such as a very high peak transmitter power and a very high bandwidth for an analog-to-digital (A/D) converter.

Pulse compression is a radar technique for reducing peak transmitter power while maintaining a fixed average transmitter power by coding the transmitted waveform in such a manner as to be able to decode the received echo into the various constituents of the transmitted code. Some pulse compression schemes, such as binary and polyphase codes, can change the phase of the transmitted signal at regular sub-pulse intervals. The length of these sub-pulse intervals determines the achievable range resolution.

Another pulse compression scheme involves continuously varying the phase of the transmitted waveform. When this phase variation is quadratic (and, therefore, the frequency variation is linear), the method is referred to as linear FM pulse, or chirp pulse compression. Such a waveform is described by:

$$y(t)=\sin\{\phi(t)\},\ 0 \le t \le \tau \qquad \text{Eqn. 1}$$

where for a linear FM pulse the phase function is described by $$\phi(t)=2\pi(f_0 t - kt/2 + kt^2/2) + \phi_0 \qquad \text{Eqn. 2}$$

where k is the linear chirp rate, $\tau$ is the pulse length, $f_0$ is the starting frequency and $\phi_0$ is the starting phase of the waveform, respectively.

It is quite common for the signal path (channel) to exhibit frequency-dependent phase perturbations which render anomalies to the transmitted waveform signal. Such distortions can be compensated by equalization techniques, including pre-distortion of the waveform. The frequency-dependent phase errors of wideband radar linear frequency modulated (LFM) chirp signals can be mitigated in this manner with a look-up table, where the instantaneous frequency output of a frequency accumulator is used to select a phase compensation that is applied to the instantaneous phase output of the subsequent phase accumulator. Such an approach for implementing chirp pulse compression can utilize a direct-digital-synthesis (DDS) circuitry, system 400, of FIG. 4 to facilitate generation of y(f). A frequency accumulator component 402 includes an adder component 410 in series with a register component 415 and a feedback loop 418 from the output of register 415 to the input through adder component 410. The frequency accumulator circuit can accumulate, or integrate, the chirp rate constant, k, and can further add the accumulated k to a programmed starting frequency $f_0$ (which has been loaded into register component 415) to facilitate provision of an output $f(t)=f_0+kt$, the instantaneous frequency. The instantaneous frequency $f(t)$ can be utilized as the input to phase accumulator component 404 where the linear frequency term $f(t)$ can be integrated to provide an output for the instantaneous phase $\phi(t)$.

The combination of accumulator component 402 and accumulator component 404 are collectively known as a phase generator (PG). The instantaneous phase $\phi(t)$ output of phase accumulator component 404 can be applied as an address to a mapping device such as a look-up table read-only memory (ROM) component 450 which can contain one cycle of a sine waveform. The resulting output of ROM component 450 can take the form of Eqn. 1. The phase accumulator component 404 and ROM component 450 form a digital portion of a conventional DDS, with the addition of a frequency accumulator 402 at the input to provide for the changing frequency of the chirp generator. The output of look-up table ROM 450 can be fed through a digital-to-analog (DAC) converter component 460 to provide an analog signal (e.g., an analog chirp signal 490) for subsequent transmission by a radar system. The phase error correction look up table (PEC LUT) 435 can be an important part of most modern chirp synthesizers which compensate for one or more non-linearities in RF components of a radar.

The advantages of system 400 can include a waveform length independent of hardware configuration, ease of changing waveform parameters, a capability of generating a continuous, constant frequency (CW) sinusoid, and a small part count. To change waveform parameters, all that is required is to change the values for the starting frequency $f_0$, the starting phase $\phi_0$, and the chirp rate k, the values all of which can be stored in registers (e.g., register component 415 and register 440). A pulse length, $\tau$, is also programmable. If desired, these parameters may be changed on a pulse by pulse basis. Since a chirp radar system may sometimes require two waveforms, one for use during transmit and a second for use during receive, the wave form synthesizer (WFM) chirp generator of FIG. 4 may be used with the starting frequency and pulse duration for each pulse loaded into different registers to permit independent specification of the transmit and receive waveforms.

While the approach illustrated in FIG. 4 can mitigate frequency-dependent phase errors, it is unable to correctly mitigate another class of phase errors, namely time-dependent phase errors. Time-dependent phase errors can be introduced into the circuit provided in FIG. 4, where, for example, a time-dependent phase error can be a result of power droop in a radar system amplifier. Power droop can be of concern for an amplifier (e.g., a traveling wave tube amplifier (TWTA)) being utilized as part of a radio frequency (RF) amplification system. For example, without a constant voltage at the amplifier, an analog chirp waveform 490 may be deleteriously affected by subsequent processing equipment comprising a radar system, for example, the transmitted waveform may be of a different profile to that generated by system 400. Accordingly, for example, if a constant voltage cannot be maintained, then the SAR's Impulse Response (IPR) may be deleteriously affected, although, for all intents and purposes it appears that the hardware and/or software associated with the SAR system is operating correctly.

SUMMARY

The following is a brief summary of subject matter that is described in greater detail herein. This summary is not intended to be limiting as to the scope of the claims.

Various exemplary embodiments presented herein relate to correcting a phase error in a radar waveform. In an exemplary embodiment a system is presented, wherein the system comprising a corrector component configured to apply a time domain correction to a waveform, wherein the time domain correction is based at least in part upon a time-dependent phase error generated by at least one component utilized in subsequently generating a radar signal based upon the waveform.

Another exemplary embodiment comprising a method for applying a time domain correction to a waveform, wherein the time domain correction being based at least in part on a time-dependent phase error engendered during subsequent generation of a radar signal, the radar signal is generated based at least in part on the waveform.

A further exemplary embodiment for correcting a phase error in a radar waveform comprises a computer-readable medium comprising instructions that, when executed by a processor, cause the processor to perform acts comprising applying a time domain correction to a waveform, wherein the time domain correction being based at least in part on a time-dependent phase error engendered during subsequent generation of a radar signal, the radar signal is generated based at least in part on the waveform.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
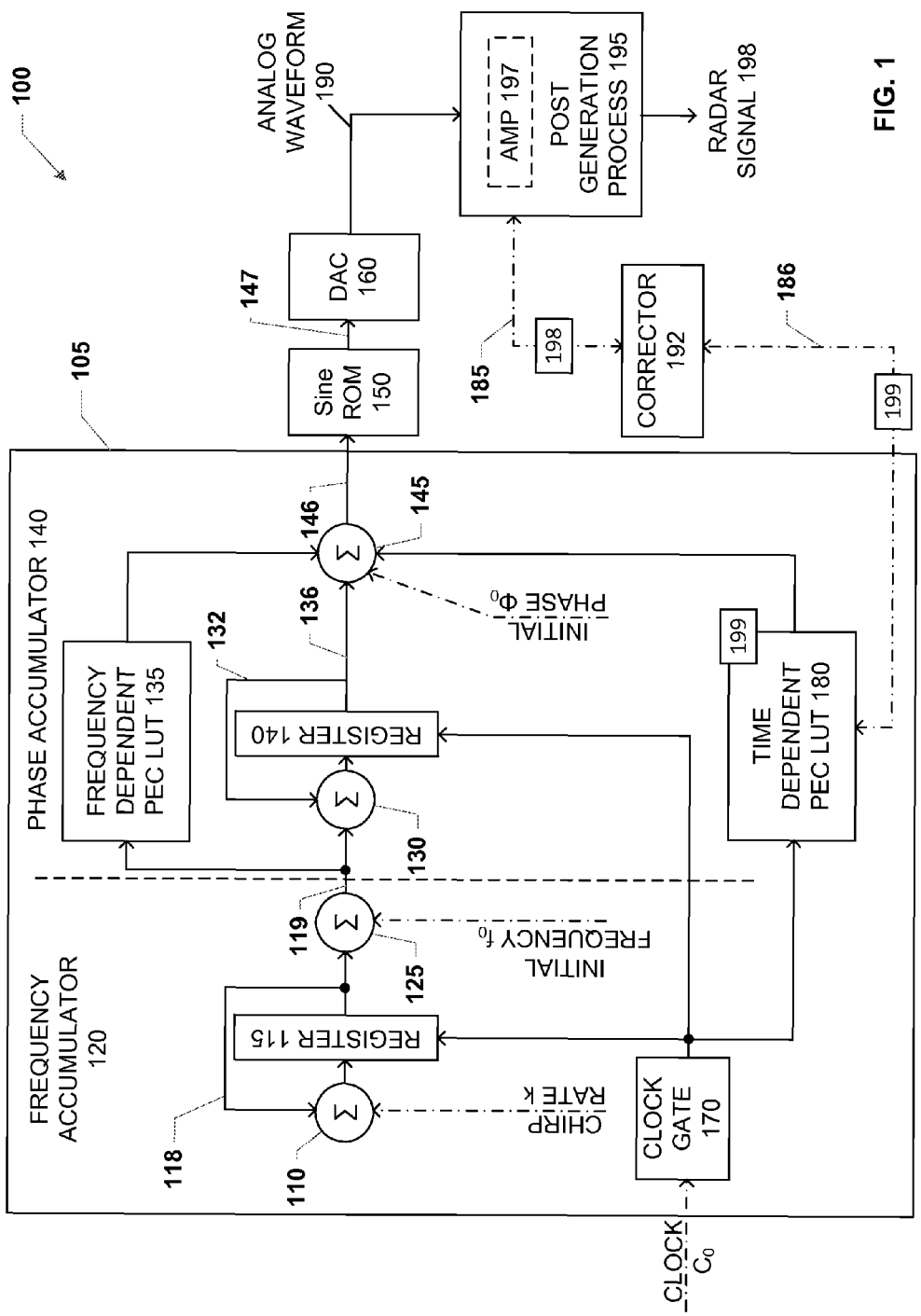
FIG. 1 illustrates a system for correcting a phase error in a radar waveform, according to an embodiment.

Various technologies pertaining to correcting a phase error generated during formation of a radar waveform are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As noted above, exemplary embodiments presented herein relate to correcting a phase error (e.g., a time-dependent phase error) generated as part of the formation of a radar waveform and subsequent radar signal (e.g., an analog chirp). In an ideal system no time-dependent phase error will occur. However, non-ideal behavior can be introduced into a system owing to various operating characteristics of the system and/or a component(s) comprising the system. For example, during amplification of a waveform, a component may undergo a voltage drop, or power-supply droop, which can be particularly evidenced during generation of a chirp pulse having a relatively long duration. With reference to an amplifier (e.g., a TWTA power amplifier), the power-supply droop can be a function of a pulse drawing energy from a storage device, such as a capacitor. The output of an amplifier can have dependency upon the power supply amplitude which can be a function of the power supply voltage, hence, as a voltage diminishes the amplitude can be deleteriously affected. While a radar chirp of a short duration has excellent bandwidth properties (e.g., a large bandwidth), a short duration radar chirp may be a low energy waveform, and hence, while having desirable range resolution measurement the return signal may be noisy. By utilizing signaling modulation, long duration LFM chirps have been developed which can contain a substantial amount of energy and further, have a wide bandwidth to facilitate fine range resolution measurements. However, owing to the duration of a long duration LFM chirp, such chirps are susceptible to time-dependent phase error, e.g., originating from an amplifier associated with generation of the long duration LFM chirp. A phase error can deleteriously affect the linearity of a radar system and hence cause a perturbation in the range response of the radar system. Such range response perturbation can reduce the detectability of a target by the radar system as well as causing interference in adjacent range bins, etc. Hence, while the technology exists to mitigate frequency-dependent phase errors, other phase errors such as time-dependent phase errors are still to be addressed. Furthermore, in an aspect, time-dependent phase errors can be independent of frequency-dependent phase errors in applications where a chirp rate is a selectable or configurable parameter, as can be common in high-performance radar systems.

FIG. 1 illustrates a system 100 to mitigate a phase error such as a time-dependent phase error. In comparison with the LFM chirp waveform synthesizer 400 illustrated in FIG. 4, a time-dependent phase error correction can also be applied to a waveform generated by a waveform generator component 105. Waveform generator component 105 can include a combination of a frequency accumulator component 120 and a phase accumulator component 140, with the combination being collectively known as a phase generator (PG). Frequency accumulator component 120 can include an adder component 110 operating in series with a register component 115 in conjunction with a feedback loop 118 being provided from an output of register component 115 to an input of register component 115 through adder component 110. The frequency accumulator component 120 can accumulate, or integrate, the chirp rate constant, k, and can further add the accumulated k to a programmed starting frequency $f_0$ (which can be loaded into register component 115) to facilitate provision of an output $f(t)=f_0+kt$, the instantaneous frequency 119.

The instantaneous frequency 119 can be utilized as an input to phase accumulator component 140. Phase accumulator component 140 can include an adder component 130 in series with a register component 140 operating in conjunction with a feedback loop 132, wherein feedback loop 132 can be provided from an output of register component 140 to an input of register component 140 through adder component 130. The instantaneous frequency 119 generated by the frequency accumulator 120 can be utilized as an input to the phase accumulator 140 where the linear frequency term 119 can be further integrated (e.g., via adder component 130, feedback loop 132 and register component 140) to provide an output 136. At adder component 145, an initial phase $\phi_0$ can be applied to the output 136, to facilitate generation of an instantaneous phase 146, $\phi(t)$, where the instantaneous phase 146, $\phi(t)=2\pi(f_0t-kt/2+kt^2/2)+\phi_0$ (per Eqn. 2). In an embodiment, a correction of the instantaneous phase 146 can be applied via adder component 145. In an embodiment, the correction can be correction of a frequency-dependent phase error, with the correction being applied in conjunction with a correcting parameter obtained from the frequency-dependent PEC LUT component 135.

In another embodiment, correction of instantaneous phase 146 can be applied in conjunction with a correcting parameter obtained from a time-dependent PEC LUT component 180. As indicated by broken lines 185 and 186, the time-dependent PEC LUT 180 can be operating in conjunction with a post waveform generation process 195. As previously mentioned, a post waveform generation process 195 can comprise of any components, such as an amplifier component 197. In an embodiment, amplifier component 197 may induce a time-dependent phase error into a waveform 190 undergoing amplification. A corrector component 192 can be monitoring operation of the amplifier 197, or any other component included in the post generation process 195, and determine, based at least in part upon the monitored operation, one or more characteristics of an induced error 198, e.g., the induced time-dependent phase error. For example, corrector component 192 can obtain data regarding an induced time-dependent phase error 198, from the post generation process 195. Based upon quantifying the phase error 198, a correction parameter 199 can be generated by corrector component 192, with the correction parameter 199 being entered into the time-dependent PEC LUT 180, and further, the correction parameter 199 can be applied during generation of the waveform 146. In an embodiment, continuing with the example of the induced error being a time-dependent phase error, the correction parameter 199 can be a time domain-based correction. Hence, for any unwanted phase error 198 induced by the post waveform generation process 195 (e.g., amplifier component 197) an according error correction 199 can be applied to balance out the unwanted phase error (e.g., reduce the phase error to a zero effect). The correction parameter 199 can have a magnitude converse to the magnitude of the phase error 198.

Further, the instantaneous phase 146 (e.g., corrected with the correction parameter 199) output of phase accumulator component 140 can be applied as an address to a mapping device such as a look-up table ROM component 150 which can contain one cycle of a sine waveform, or a portion thereof. It is possible that the resulting output 146 can have a form similar to Eqn. 2, where the instantaneous phase $\phi(t)$ may be corrected, per Eqn. 2

$$\phi(t)=2\pi(f_0t-kt/2+kt^2/2)+\phi_0+\phi_{correction}(t) \qquad \text{Eqn. 3}$$

The phase accumulator component 140 and ROM component 150 can form a digital portion of a conventional DDS, with the addition of a frequency accumulator 120 at the input can provide for the changing frequency of the chirp generator. The output waveform 147 of look-up table ROM 150 can be fed through a DAC component 160 to convert waveform 147 in a digital format to an analog format, to provision an analog signal (e.g., an analog waveform 190) for subsequent transmission by a radar system. For example, any of waveforms 119, 136, 146, or 147 can be in digital format while analog waveform 190 and radar signal 198 can be in analog format. The analog waveform 190 can undergo processing by one or more components comprising a post generation process 195 (e.g., signal amplification by amplifier 197). By 'pre-distorting' the analog waveform 190 (e.g., in conjunction with the time-dependent PEC LUT 180 and the error correction 199), any unwanted effect placed upon the waveform 190 during post generation processing can be mitigated by the pre-distortion applied to waveform 146. Hence, during processing of the pre-distorted analog waveform 190 by the post generation process 195, Eqn. 3 would be corrected to the desired waveform of Eqn. 2.

A clock gate 170 is further provided and can be respectively connected to register component 115, register component 140, and adder component 145. Hence, in an embodiment, the relevant start time of correcting a time-dependent waveform can be with respect to the start of the waveform itself.

Figure 4:
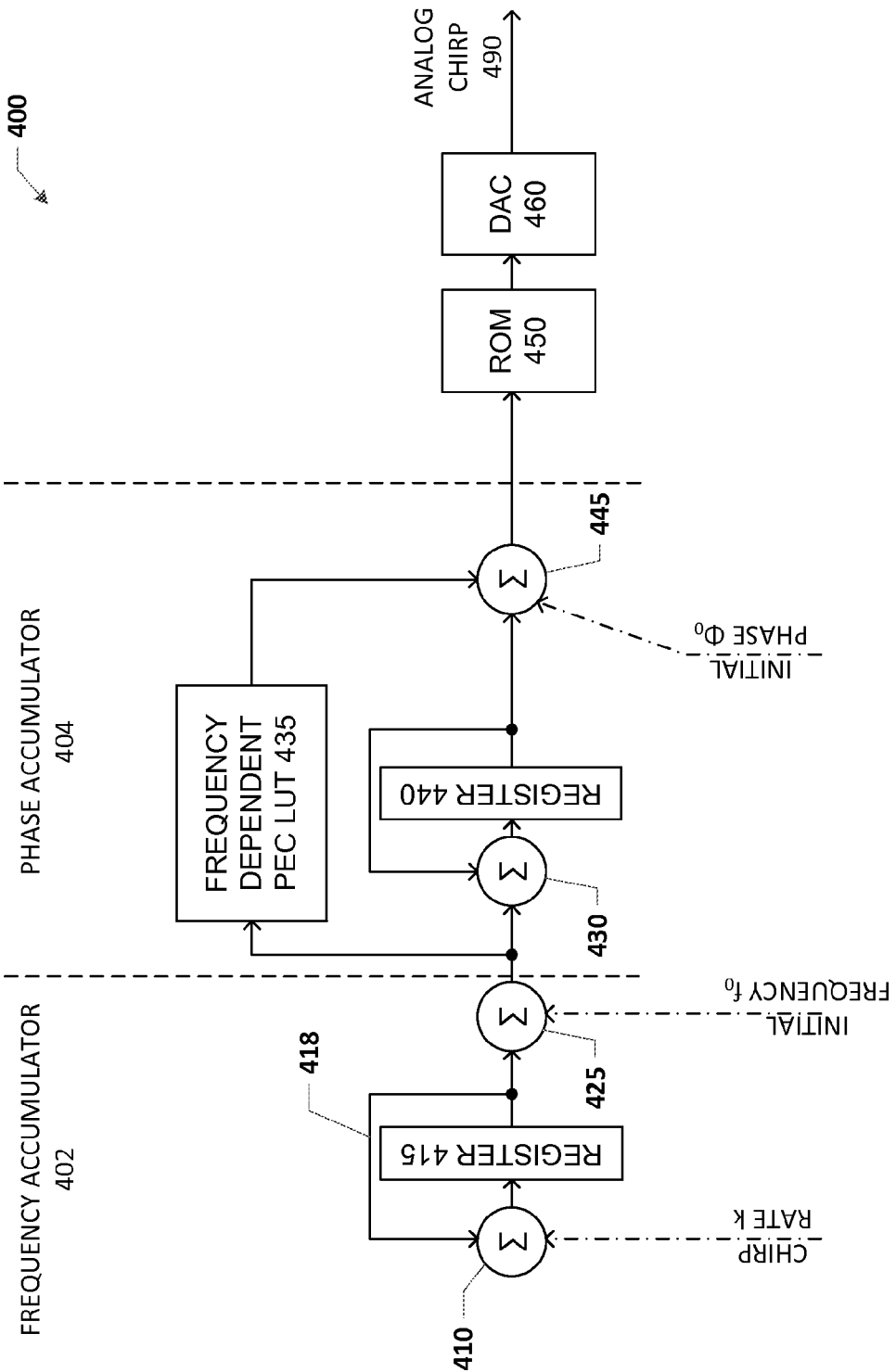
FIG. 4 illustrates a system for correcting a frequency-dependent phase error in a radar waveform; according to an embodiment.

Hence, in comparison with FIG. 4, at least one of a frequency-dependent phase error or a time-dependent phase error occurring in a waveform generated by the LFM chirp waveform synthesizer system 100 can be respectively corrected by utilization of the frequency dependent PEC LUT component 135 and/or the time dependent PEC LUT component 180. Thus, in an embodiment, even if an unwanted effect (e.g., a power droop) occurs during generation of a waveform (e.g., by a component comprising post generation process 195), it is possible to correct a time-dependent phase error engendered by the unwanted effect by the time dependent PEC LUT component 180 and the error correction 199.

It is to be appreciated that while the foregoing has been directed towards a phase error, e.g., a time-dependent phase error, being effectuated by power droop of an amplifier, the various embodiments presented herein are not so limited. Rather, the various embodiments can be applied to any application exhibiting and/or undergoing a time-dependent phase error. For example, a system may be susceptible to phase error as a function of an operating condition such as the operating temperature of one or more RF components included in the system. In another example, a time-dependent phase error may be generated owing to a variation in a clock frequency/timing. In another example, a time-dependent phase error may be generated as a function of an operation in generation of the waveform, for example, introducing frequency variation in a waveform. Further, while the embodiments presented herein are directed toward a LFM waveform synthesizer and associated waveform, the various embodiments can be applied to other waveforms, such as NLFM chirps, and other modulation schemes.

Figure 2:
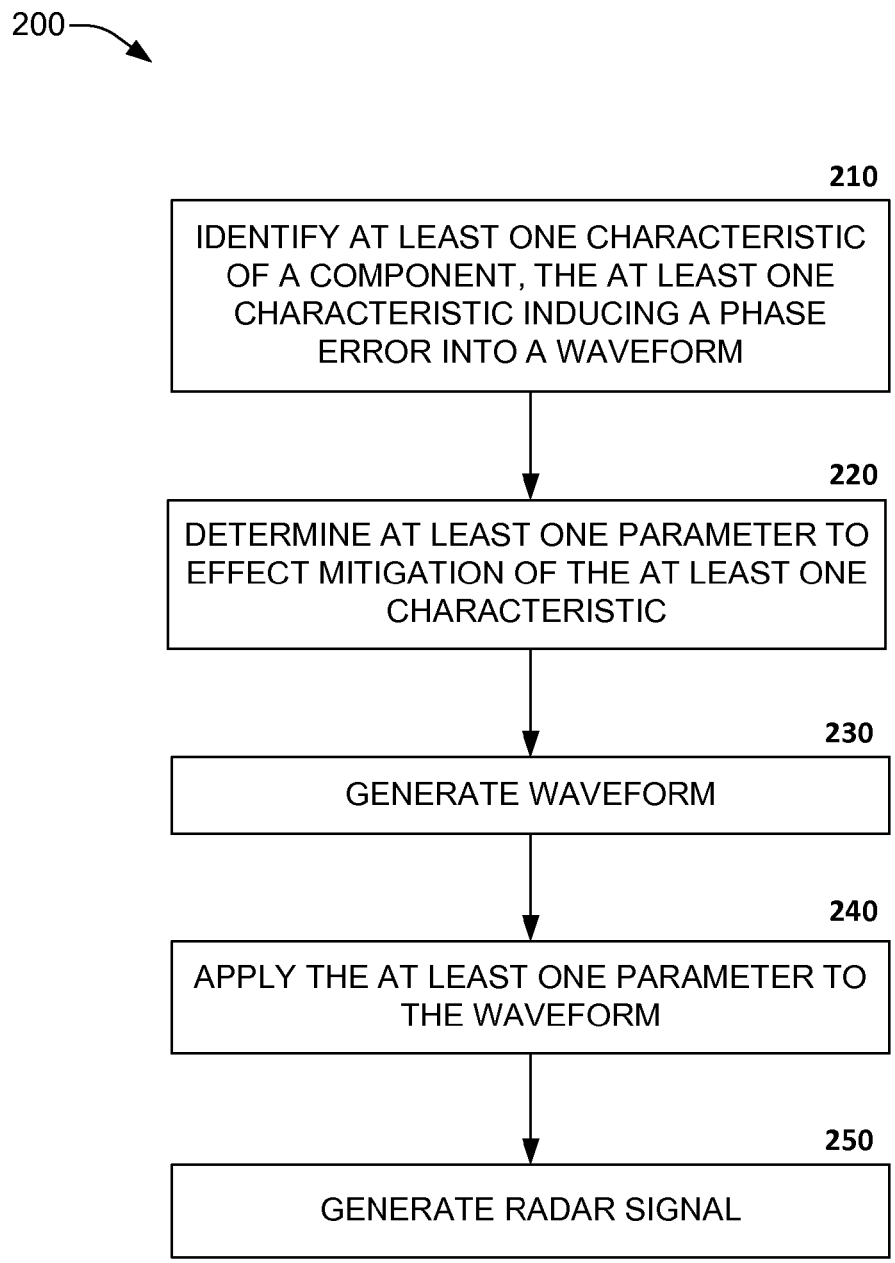
FIG. 2 is a flow diagram illustrating an exemplary methodology for correcting a phase error in a radar waveform.

FIG. 2 illustrates an exemplary methodology relating to correcting a phase error, such as a time-dependent phase error. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

As previously mentioned, a phase error such as a time-dependent phase error can be induced into a waveform as part of the waveform generation process. For example, a time-dependent phase error may be induced as a result of a power droop occurring on an amplifier associated with generation of a waveform. At 210, for a component associated with processing a waveform (e.g., an amplifier), at least one characteristic can be identified regarding the component deleteriously affecting a waveform.

At 220, as previously mentioned a waveform generated by a frequency/phase generator can be pre-distorted to compensate for any deleterious effect induced into the waveform by a component associated with processing of the waveform. Hence, at least one correcting parameter (e.g., a time domain correction) can be generated, where the at least one correcting parameter has a magnitude equal, but opposite, to the at least one characteristic deleteriously affecting the waveform, as identified in act 210.

At 230, a waveform can be generated, where, as part of the waveform generation any of a chirp rate constant k, an initial frequency $f_0$, and/or an initial phase $\phi_0$ can be applied during the waveform generation process.

At 240, further to the waveform generation process, the at least one correcting parameter can be applied to the waveform. Application of the at least one correcting parameter facilitates pre-distorting the waveform to compensate for the at least one characteristic deleteriously affecting the waveform during generation of the radar signal.

At 250, a radar signal can be generated based upon the waveform. For example, the waveform can be utilized as part of an amplification process for generation of the radar signal. As previously mentioned, an amplifier can induce an time-dependent phase error into the radar signal generation process, however, pre-distortion of the waveform mitigates the deleterious effect of the time-dependent phase error induced by the amplifier.

Figure 3:
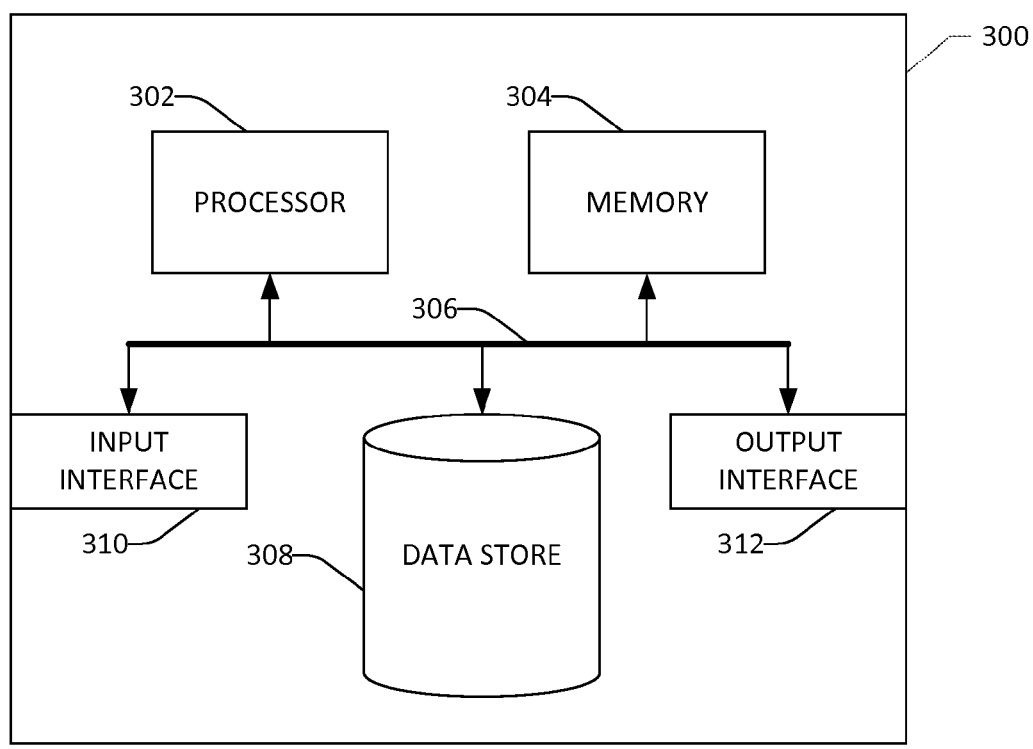
FIG. 3 illustrates an exemplary computing device

Referring now to FIG. 3, a high-level illustration of an exemplary computing device 300 that can be used in accordance with the systems and methodologies disclosed herein is illustrated. For instance, the computing device 300 may be used identify a phase error, e.g., a time-dependent phase error, that can be induced during generation of a radar signal, and can accordingly, generate a pre-distorted waveform to compensate for the induced phase error. For example, computing device 300 can operate as corrector component 192 in association with the time dependent PEC LUT 180. The computing device 300 includes at least one processor 302 that executes instructions that are stored in a memory 304. The instructions may be, for instance, instructions for implementing functionality described as being carried out by one or more components discussed above or instructions for implementing one or more of the methods described above. The processor 302 may access the memory 304 by way of a system bus 306. In addition to storing executable instructions, the memory 304 may also store operating parameters, required operating parameters, and so forth.

The computing device 300 additionally includes a data store 308 that is accessible by the processor 302 by way of the system bus 306. The data store 308 may include executable instructions, operating parameters, required operating parameters, etc. The computing device 300 also includes an input interface 310 that allows external devices to communicate with the computing device 300. For instance, the input interface 310 may be used to receive instructions from an external computer device, from a user, etc. The computing device 300 also includes an output interface 312 that interfaces the computing device 300 with one or more external devices. For example, the computing device 300 may display text, images, etc., by way of the output interface 312.

Additionally, while illustrated as a single system, it is to be understood that the computing device 300 may be a distributed system. Thus, for instance, several devices may be in communication by way of a network connection and may collectively perform tasks described as being performed by the computing device 300.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A radar system comprising:
a direct-digital-synthesis (DDS) circuit, wherein the DDS circuit is configured to output a digital signal, the digital signal comprises linear frequency modulated (LFM) chirp signals, wherein the DDS circuit is configured to apply chirp pulse compression to the digital signal during the output of the digital signal;
a digital to analog convertor (DAC) that is electrically coupled to the DDS circuit, the DAC configured to convert the digital signal to an analog signal;
an amplifier that amplifies the analog signal and introduces a time-dependent phase error into the analog signal when amplifying the analog signal, wherein the digital signal comprises a frequency dependent phase perturbation that is induced by the DDS circuit when applying the chirp pulse compression to the digital signal, wherein a radar signal is transmitted based upon the analog signal, and further wherein the time-dependent phase error is caused by power droop at the amplifier; and
a corrector component that is electrically coupled to the amplifier and the DDS circuit the corrector component determines a characteristic of the time-dependent phase error;
wherein the DDS circuit comprises a phase accumulator, wherein the corrector component directs the characteristic of the time-dependent phase error to the phase accumulator, and further wherein the phase accumulator comprises data storage that retains:
a frequency domain phase error correction look up table (PEC LUT), the frequency domain PEC LUT stores frequency domain correction information to correct frequency dependent phase perturbations induced by the DDS circuit; and
a time domain PEC LUT, the time domain PEC LUT stores time domain correction information to correct time-dependent phase errors introduced into the analog signal by the amplifier, the phase accumulator configured to:
determine a frequency domain correction parameter in the frequency domain PEC LUT based upon a correlation between the frequency dependent phase perturbation and the frequency domain correction parameter stored in the frequency domain PEC LUT;
apply the frequency domain correction parameter to the digital signal such that the frequency dependent phase perturbation is corrected;
determine a time domain correction in the time domain PEC LUT based upon the characteristic of the time-dependent phase error received from the corrector component; and
apply the time domain correction parameter to the digital signal such that the digital signal is pre-distorted to correct the time-dependent phase error induced in the analog signal by the amplifier.

2. The radar system of claim 1, wherein the DDS circuit further comprises a frequency accumulator that operates in conjunction with the phase accumulator.

3. The radar system of claim 1, wherein the DDS circuit outputs the digital signal based upon a constant k, an initial frequency $f_0$, or an initial phase $\phi_{0.}$ of the chirp signals.

4. The radar system of claim 1, wherein the DDS circuit comprises a memory component configured to store at least one of a sine wave or a portion of a sine wave, the DDS circuit outputs the digital signal based upon the at least one of the sine wave or the portion of the sine wave.

5. The radar system of claim 4, wherein the time domain correction parameter is applied to the at least one of the sine wave or the portion of the sine wave to correct the time-dependent phase error.

6. A method, comprising:
at a direct-digital-synthesis (DDS) circuit of a radar system, generating a digital signal, wherein the digital signal applies chirp pulse compression when generating the digital signal, wherein the DDS circuit introduces a frequency dependent phase perturbation into the digital signal when applying the chirp pulse compression;
outputting the digital signal, the digital signal comprises linear frequency modulated (LFM) chirp signals;
converting the digital signal to an analog signal;
amplifying the analog signal, wherein due to power droop at the amplifier, amplifying the analog signal introduces a time-dependent phase error into the amplified analog signal, and further wherein a radar signal is transmitted by the radar system based upon the amplified signal;
determining a time domain correction parameter based upon the time-dependent phase error caused by the amplifier and a frequency domain correction parameter based upon the frequency dependent phase perturbation;
outputting the time domain correction parameter and the frequency domain correction parameter to the DDS circuit;
at the DDS circuit:
modifying the digital signal based upon the time domain correction parameter, wherein modifying the digital signal based upon the time domain correction parameter pre-distorts the digital signal to correct the time-depend phase error introduced into the analog signal by the amplifier; and
modifying the digital signal based upon the frequency domain correction parameter, wherein modifying the digital signal based upon the frequency domain correction parameter corrects the frequency dependent phase perturbation introduced into digital signal by the DDS to be correct; and
repeating the acts of generating, outputting, converting, determining, outputting, modifying, and modifying while the radar system transmits the radar signal.

7. The method of claim 6, wherein determining the time domain correction parameter comprises determining the time-dependent phase error.

8. The method of claim 5, further comprising storing the time domain correction in a time dependent phase error correction look up table (PEC LUT) of the DDS circuit.

9. The method of claim 5, further comprising, at the DDS circuit, generating the digital signal based upon at least one of a chirp rate constant k, an initial frequency $f_0$, or an initial phase $\phi_{0.}$ for the LFM chirp signals.

10. The method of claim 9, wherein the digital signal is generated based upon at least one of a sine wave or a portion of a sine wave stored in a memory component of the DDS circuit.

11. A radar system comprising:
generating means for generating a digital signal, wherein the generating means applies chirp pulse compression when generating the digital signal, and further wherein the generating means introduces a frequency dependent phase perturbation into the digital signal when applying the chirp pulse compression;
outputting means for outputting the digital signal, the digital signal comprises linear frequency modulated (LFM) chirp signals;
converting means for converting the digital signal to an analog signal; and
amplifying means for amplifying the analog signal, wherein the means for amplifying the analog signal introduces a time-dependent phase error into the analog signal when amplifying the analog signal, wherein the time-dependent phase error is caused by power droop at the amplifier, and further wherein a radar signal is transmitted based upon the analog signal; and
wherein the outputting means comprises correcting means for pre-distorting the digital signal to correct the time-dependent phase error in the analog signal induced by the amplifying means and for correcting the frequency dependent phase perturbation in the digital signal, wherein the outputting means modifies the digital signal based upon a time domain correction parameter identified by the correcting means, the time domain correction parameter configured to correct the time-dependent phase error introduced into the analog signal by the amplifying means, wherein the outputting means further modifies the digital signal based upon a frequency domain correction parameter identified by the correcting means, the frequency domain correction parameter configured to correct the frequency dependent phase perturbation introduced into the digital signal.

12. The radar system of claim 11, wherein the correcting means is configured to determine a magnitude of the time-dependent phase error, and further wherein the correcting means is configured to determine the time domain correction parameter based upon the magnitude of the time-dependent phase error.

13. The radar system of claim 11, wherein the outputting means comprises data storage that retains a time-dependent phase error correction look up table (PEC LUT), and further wherein the time domain correction parameter is retained in the PEC LUT.

* * * * *